United States Patent [19]

Leach

[11] Patent Number: 5,330,602

[45] Date of Patent: Jul. 19, 1994

[54] MANUFACTURE OF ARTICLES THAT INCLUDE THERMOSETTING POWDER COATINGS

[76] Inventor: Roger J. Leach, Chardai, St George's Hill, Byfleet Road, Cobham, Surrey KT11-1EA, England

[21] Appl. No.: 834,563

[22] PCT Filed: Aug. 14, 1990

[86] PCT No.: PCT/GB90/01286

§ 371 Date: Feb. 14, 1992

§ 102(e) Date: Feb. 14, 1992

[87] PCT Pub. No.: WO91/02648

PCT Pub. Date: Mar. 7, 1991

[30] Foreign Application Priority Data

Aug. 15, 1989 [GB] United Kingdom ............. 8918637.3

[51] Int. Cl.$^5$ .................... B32B 31/00; C09J 5/02
[52] U.S. Cl. ....................... 156/283; 156/307.5; 427/195; 428/402; 428/418; 428/431
[58] Field of Search ............ 428/402, 418, 431, 195, 428/289, 292; 156/283, 307.5; 427/195

[56] References Cited

U.S. PATENT DOCUMENTS

| | | | |
|---|---|---|---|
| 1,724,211 | 8/1929 | MacQuarrie | 156/100 |
| 2,468,568 | 4/1949 | McCusker | 428/432 |
| 2,549,393 | 2/1945 | Cook | 411/419 |
| 2,558,848 | 7/1951 | Harrison | 359/599 |
| 2,658,849 | 11/1953 | Lew | 524/444 |
| 2,754,237 | 7/1956 | Brooks | 156/315 |
| 2,807,111 | 9/1957 | Turner | 428/172 |
| 2,890,147 | 6/1959 | Pearson et al. | 156/283 |
| 2,981,651 | 8/1961 | Arnold | 277/235 R |
| 2,995,482 | 8/1961 | Boyce | 156/283 |
| 3,172,797 | 3/1965 | Bungardt | 156/283 |
| 3,207,358 | 9/1965 | Fliss | 219/385 |
| 3,334,008 | 8/1967 | Park | 428/429 |

(List continued on next page.)

FOREIGN PATENT DOCUMENTS

| | | |
|---|---|---|
| 0251308 | 5/1964 | Australia . |
| 663154 | 4/1965 | Belgium . |
| 0630877 | 11/1961 | Canada . |
| 36616 | 9/1981 | European Pat. Off. . |
| 39749 | 11/1981 | European Pat. Off. . |
| 2017723 | 10/1971 | Fed. Rep. of Germany . |
| 2134284 | 12/1972 | France . |

(List continued on next page.)

OTHER PUBLICATIONS

Shields, Surface Preparation, Adhesive Handbook, 1970, pp. 235-236.

Dow Corning Corp., Chapter 1, Silane Coupling Agents: Their Function, Chemistry, Mechanics, etc. 1981, pp. 2-13.

(List continued on next page.)

Primary Examiner—Patrick J. Ryan
Assistant Examiner—William A. Krynski
Attorney, Agent, or Firm—Cushman, Darby & Cushman

[57] ABSTRACT

In manufacture of a glass architectural panel (FIG. 1) an aluminium foil is bonded to a glass sheet via a layer of thermosetting polyester powder-coating material. The powder is deposited on the foil as the foil unrolls and is melted to provide a fused layer which is then cooled to solidify the layer and arrest progress of curing. The solidified layer is sprayed with a silane adhesion promoter, before being heated momentarily to enable the foil with its adhering and solidified, but uncured, layer, to be rolled up for storage. The rolled foil is transferred nearer to a float-glass production line, where, after being heated to allow it to be unrolled, it is fed onto a hot glass sheet emerging from the line. The fused layer melts as it is brought down with the backing foil to contact the glass sheet and fulfil the cure of the powder material so as to establish the bond. Instead of a single foil, several may be provided overlapping one another (FIG. 3). Decorative effects can be obtained using different pigmentations of powder and partial metallization of the glass (FIG. 4). The technique of interrupting the cure is applicable to provision of a glass window (FIG. 5) and a glass laminate (FIG. 6).

4 Claims, 4 Drawing Sheets

U.S. PATENT DOCUMENTS

| | | | |
|---|---|---|---|
| 3,580,796 | 5/1971 | Hick | 428/38 |
| 3,784,395 | 1/1974 | McKown | 427/461 |
| 3,912,842 | 10/1975 | Swartz | 428/172 |
| 3,970,633 | 7/1976 | Miller et al. | 428/431 |
| 4,054,713 | 10/1977 | Sakaguchi | 428/285 |
| 4,076,567 | 2/1978 | Yoshikawa | 156/219 |
| 4,079,168 | 3/1978 | Schwemmer et al. | 428/418 |
| 4,309,484 | 1/1982 | Ohmae | 428/441 |
| 4,382,995 | 5/1983 | Lin | 428/415 |
| 4,465,734 | 8/1984 | Laroche | 428/317.1 |
| 4,491,389 | 1/1985 | Coburn | 359/848 |
| 4,550,986 | 11/1985 | Leach | 359/883 |
| 4,610,115 | 9/1986 | Thompson | 52/171 |
| 4,816,096 | 3/1989 | Gillner | 156/106 |
| 4,824,729 | 4/1989 | Livi | 428/428 |
| 5,089,076 | 2/1992 | Leach | 156/106 |

FOREIGN PATENT DOCUMENTS

| | | |
|---|---|---|
| 50-85688 | 7/1975 | Japan . |
| 60-23038 | 2/1985 | Japan . |
| 0630877 | 7/1979 | U.S.S.R. . |
| 0877520 | 9/1961 | United Kingdom . |
| 906475 | 9/1962 | United Kingdom . |
| 0999821 | 7/1965 | United Kingdom . |
| 1024126 | 3/1966 | United Kingdom . |
| 1327931 | 8/1973 | United Kingdom . |
| 1365758 | 9/1974 | United Kingdom . |
| 1430484 | 3/1976 | United Kingdom . |
| 1464965 | 2/1977 | United Kingdom . |
| 2048166 | 12/1980 | United Kingdom . |
| 2074089 | 10/1981 | United Kingdom . |
| 2207089 | 1/1989 | United Kingdom . |

OTHER PUBLICATIONS

Kut, Epoxy, Acrylic and Polyster . . . Applications, Metal Finishing, 1973, pp. 41–45.

Guttmann, Structural Adhesives, Concise Guide to Structural Adhesives, 1961.

MANUFACTURE OF ARTICLES THAT INCLUDE THERMOSETTING POWDER COATINGS

This invention relates to methods of manufacturing an article, of the kind in which thermosetting organic powder-coating material is melted to fuse it into a layer, and a bond is made between the layer and a component that is to form part of the manufactured article by establishing contact between the layer and said component while the layer is in a melted condition and until the material is cured.

Methods of manufacture of this above-specified kind are described in UK Patent Specification No 2,207,089. In particular, there is described a method for establishing a bond between a surface of a glass sheet to which a thermosetting organic powder has been applied, and a metal foil that is to back the glass sheet in a manufactured architectural panel. Contact is established between the foil and the powder while the powder is in a melted condition on the glass prior to curing, and is maintained during curing of the powder so that a bond is formed between the foil and the glass sheet via the cured powder material.

The present invention represents a development from the invention described in UK Patent Specification No 2,207,089. In this regard, it is an object of the present invention to provide a method of manufacturing an article, of said above-specified kind, that facilitates making the bond.

According to the present invention there is provided a method of manufacturing an article, of said above-specified kind, wherein following the step of melting the powder material to fuse it into the layer and before the step of establishing contact between the layer and said component, the temperature of the layer is reduced so as to retard curing of the layer between those two steps.

The reduction of temperature of the layer may be sufficient to harden the fused material. Heat to melt the hardened layer for making the bond with said component may be applied before or after contact is established with said component.

According to a feature of the present invention, a method of manufacturing an article comprises the steps of forming a substantially solidified layer of fused, but uncured, thermosetting organic powder-coating material on a backing, and establishing contact between the backed layer and a component that is to form part of the manufactured article, heat being applied to the layer to melt it and fulfil curing of the powder material while the melted layer is in contact with said component so that a bond is formed between the powder material and said component.

At least part of the heat required to melt the layer and cure it, may be derived from heat of said component itself.

The step according to the present invention of forming the layer of fused, but uncured, powder-coating material, may be carried out remotely from the step of establishing contact with said component and making the bond between the cured powder material and said component. This is of especial advantage in circumstances in which deposition of powder cannot be readily or desirably carried out where the ultimate bond is to be made, because, for example, the facilities are inadequate or cleanliness is required. The method according to the present invention, like that of the invention described in UK Patent Specification No 2,207,089, has application for bonding together items of varying materials, typically: of a metal or plastics item to a metal item; of a metal foil or other item to a glass sheet; and of glass items to one another, as for example in forming a glass laminate. Furthermore, the invention is of advantage more especially in the provision of glass cladding and other glazing for both exterior and interior architectural purposes. In this latter respect, the fused layer of powder material can be brought to the glass for the bond to be established, without the necessity for the powder to be deposited on the glass; this enables the coating to be bonded to glazing at the place of installation or even when already installed. More especially, it enables the bonding to take place where the glass is manufactured and the presence of loose powder is undesirable or not acceptable.

The invention recognises that it is possible to interrupt or retard the process by which powder-coating material effects a bond in the methods described in UK Patent Specification No 2,207,089, and then to re-start or revive the process to fulfil the curing and effect the bond, at a later stage and/or elsewhere. This ability to interrupt the process makes it possible to fuse the powder and allow it to form a substantially solidified, but uncured, layer, and then to re-start the process by which the powder is melted and contact between the melt and the component to which the bond is to be made, is maintained while the curing is fulfilled to establish the bond.

A plurality of separate elements each comprising a substantially solidified layer of fused, but uncured, thermosetting organic powder-coating material carried by a backing, may be formed in the method of the invention. These elements may be applied to said component in overlapping or other relationship, to bond them to it within different regions of the component, bonding of each element being effected by applying heat to the powder-coating layer of that element to melt it and fulfil curing of the powder material while in contact with said component. The powder materials used for different ones of the elements may differ in pigmentation; this feature may be utilised for providing a decorative effect.

As another aspect of the invention there is provided, in essence as an intermediate product of the above-described manufacturing methods of the invention, an element in which a substantially solidified layer of fused thermosetting organic powder-coating material is carried on a metal-foil or other backing, wherein the powder-coating material is incompletely cured. Such an element may be readily used to establish a bond between the powder material and a component simply by applying heat to the layer to melt it and fulfil curing of the powder material while it is in contact with the component.

Manufacturing methods in accordance with the present invention, will now be described, by way of example, with reference to the accompanying drawings, in which.

Figure 1:
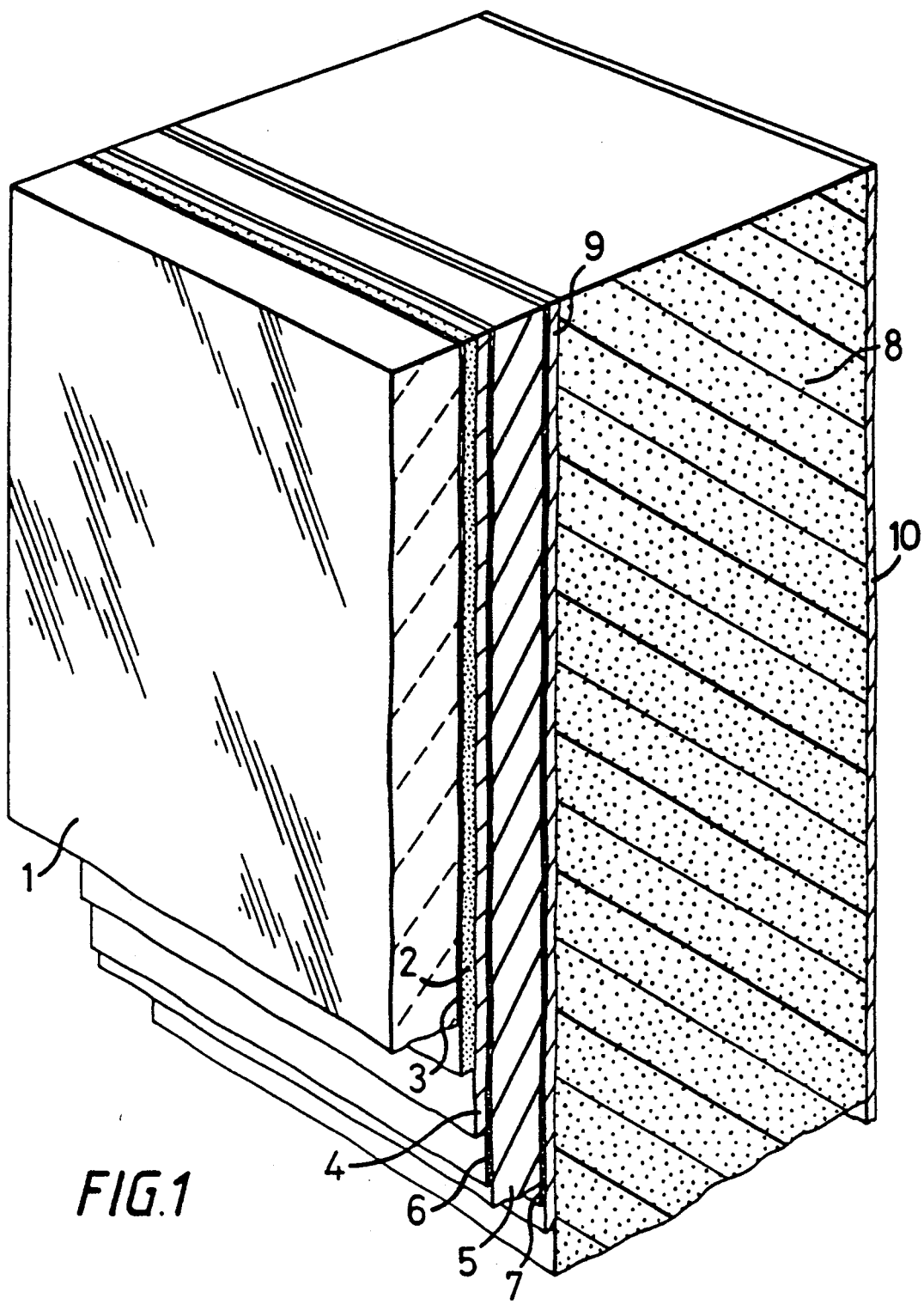
FIG. 1 is a perspective view of part of an architectural panel manufactured by a method according to the present invention.

The architectural panel to be described with reference to FIG. 1, is of a form suitable for use in providing glass cladding to exterior or interior walls of buildings. For this application, the panel is rectangular with glass-face dimensions of some 3×1.2 meters, and an overall thickness of some 28 millimeters; clearly panels of larger or smaller dimensions can be provided.

Referring to FIG. 1, the panel is faced by a sheet 1 of clear, annealad glass having a thickness of 4 millimeters. The glass sheet 1 is backed by a cured polyester powder-coating 2 bonded to the sheet 1 via an interlayer 3 of silane adhesion-promoter. The interlayer 3 is very thin (perhaps only one molecule thick), and the coating 2, which has a thickness in the range from 60 to 120 microns, contains a pigment to show colour in the glass facing and give the visual effect of coloured glass to the cladding panel.

The layer or coating 2 has a backing of aluminium foil 4 that is bonded to the sheet 1 via the coating 2. The foil 4 has a thickness of 0.07 millimeter, and being of good thermal conductivity, serves to equalize temperature variations across the panel. The function of the foil 4 in this latter regard is important in the context of the use of annealed glass, which is less resistant to temperature gradients than toughened glass, especially in exterior applications where part of the panel may be in sunlight and part in shadow. However, the foil 4 also has a protective function in relation to the general porosity of the coating 2, the foil 4 in this regard protecting the coating 2 against degradation from moisture and weathering generally; the nature of the intimate bond obtained according to the invention, between the coating 2 and the foil 4, without the need for introduction of an adhesive interlayer between them, is especially advantageous.

Even to the limited extent that the panel of FIG. 1 has so far been described, it is capable of being used for cladding purposes, whether in the form of large sheets as described, or smaller tiles. In particular, the use of annealed glass enables the panel to be readily cut to size on site, but the usefulness of the panel, in particular its capability of resisting impact and thermal shock, is greatly enhanced by the addition, as illustrated in FIG. 1, of an element 5 of flexible and compressible open-called foamed plastics or rubber material, bonded to the back of the aluminium foil 4. The element 5 is in the form of a layer of some 3 millimeters in thickness, and has both faces covered by layers 6 and 7 of finely-woven or knitted nylon mesh that has been flame-welded to the layer 5; the mesh serves to stabilize the layer during its bonding into the panel. A rigid board 8 of foamed polyurethane and/or polyisocyanurate or phenolic resin, faced with sheets 9 and 10 of aluminized paper or glass fibre, is bonded to the element 5 via the facing layer 7, to add rigidity and further damage-protection to the panel without detracting from the ease of cutting and fitting on site.

The foil 4 has a significant effect in equalizing temperature variations across the panel, as well as providing protection for the coating 2. Incorporation of the open-cell element 5 into the panel to back the foil 4, not only significantly enhances the resistance of the glass to impact, but also adds further to its ability to withstand temperature differential between adjacent areas of the glass. The open-cell structure tends to promote the dispersion of heat across the glass, and thereby tends to reduce temperature gradients, by retarding movement of hot gas away from the foil 4 and enhancement of its movement across the back of the panel.

Tests with annealed glass have indicated that the capacity of the glass to withstand temperature differential was increased by some 80 to 90 degrees Celsius when provided with the coating 2 and its foil 4 backed by the element 5. Furthermore, such tests have shown that as well as greatly increasing impact resistance of the glass, the construction reduces significantly the extent of splintering when the glass does eventually break.

Figure 2:
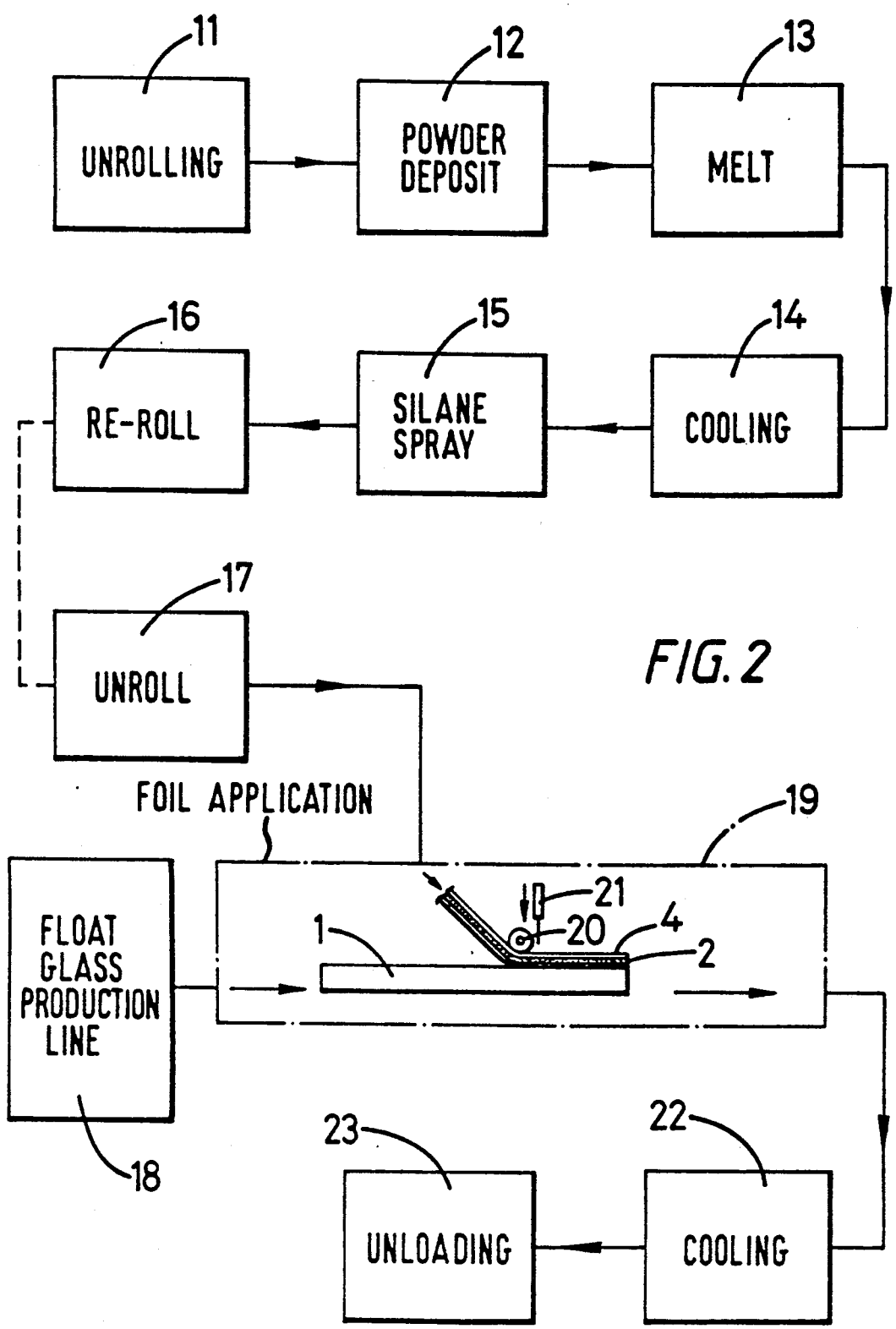
FIG. 2 is a schematic representation of part of a production line for manufacturing the architectural panel of FIG. 1.

The method of manufacturing the panel will now be described with reference to FIG. 2, which illustrates part of a production line for manufacturing panels of the form shown in FIG. 1, in a continuous process. The manufacturing process will be described, and the production line is illustrated in FIG. 2, only up to the stage at which the glass sheet 1 has been provided with the cured coating 2 and its aluminium foil-backing. The addition of the layer-element 5 and board 8, where desired, can be carried out in essentially the same manner as the provision of like layers and boards for mirrors, described in UK Patent Specification No 2,048,166, and will not be described here.

The method to be described with reference to FIG. 2 takes place in conjunction with production of the sheet 1 of annealed glass by a float-glass process, and the powder-coating 2 and aluminium foil 4 are applied as one to the glass sheet 1 as it emerges hot from that process. (If toughened or heat-strengthened, rather than annealed, glass were required, then the process would be carried out instead as the glass emerges from the toughening or heat-strengthening process.) No initial cleaning and heating of the glass is accordingly required, and the handling and deposition of the loose powder takes place away from the vicinity of glass production in a preliminary part of the method. This preliminary part of the method involves a roll of aluminium foil that has been pre-treated by the rinse method with a mixed aluminium phosphate and chromium III phosphate primer; it is from this roll that the foil 4 is subsequently cut.

Referring to FIG. 2, the roll of aluminium foil is progressively unrolled at a station 11 to pass as a horizontal (or vertical) web into a station 12. The station 12 includes provision for electrostatic or tribostatic deposition of polyester powder-coating material on the upper surface of the foil web. The powder, which is the milled product of extruding a melted mixture of a polyester resin, cross-linking agents and pigments, is deposited on the foil evenly, and to a depth within the range 60 to 120 microns, by regulating the uniformity and speed of progress of the foil through the station 12. As the foil leaves the station 12, its lower face is brush- and vacuum-cleaned to ensure that none of the powder remains on this face.

The foil now moves into a melt station 13 where infrared heaters maintain a temperature of some 200 degrees Celsius, so as to melt the powder. The heat is applied uniformly across the whole body of powder for a period of time within the range of about one-and-a-half to six minutes, before the foil moves out of the station 13 into a cooling station 14. The powder at this stage has melted to become a continuous film coating or layer on the foil, but the period for which the foil remains within station 13 is insufficient to cure the powder, and the cooling within station 14 brings the process of cross-polymerisation that has begun, to an effective halt.

The cooling or layer causes the consolidated-powder coating to solidify and adhere to the foil.

The cooled, solidified coating is carried by the foil into a spray station 15. In the station 15, the upper surface of the coating is sprayed with a fine mist of a solution of silane in a blend of isopropanol and distilled water. As the foil moves from the station 15, warm air is directed at the coating to leave it covered with a thin layer of silane that becomes the interlayer 3 in the finished panel.

The foil is supported and kept from flexing following cooling in station 14 and through station 15, since flexing would be likely to cause the uncured powder to crack away from the foil. However, after station 15, the coating-carrying foil moves into station 16 where it is heated momentarily by infra-red heaters to a temperature within the range 100 to 180 degrees Celsius (say to 104 degrees Celsius), and rolled up on a storage reel. The heating causes the coating to become plastic or pliable so as to adapt to the rolling up of the foil on the reel, without breaking away.

The storage reel holding the foil with its adhering uncured, silane-coated powder-coating, may be brought into use directly from the preliminary part of the method, or may be retained in a cooled state until required. In either case, the storage reel is transferred to a station 17 near the location of the float-glass production line 18 for application of the foil and coating from its roll to the hot glass sheet 1 as it emerges from the line 18 (possibly after passage through a quality-control station). In this latter respect the roll is heated within the station 17 to a temperature of 100 degrees Celsius, to ensure that the coating is pliable and unrolls with the foil without breaking away, as the foil is dispensed onto the glass sheet 1.

The glass sheet 1 leaves the float tank of the line 18 at a temperature in excess of 600 degrees Celsius and is cooled to emerge from the line 18 and enter a foil-application station 19 at a temperature of 230 degrees Celsius. The foil is dispensed from station 17 onto the glass sheet 1 with the silane-covered face of the uncured powder-coating downwards onto the uppermost surface of the glass sheet 1. Heat from the glass transfers to the coating and foil, raising the temperature of the powder coating to some 220 degrees Celsius. This re-melts the fused powder and carries the curing process through to fulfilment.

The leading edge of the foil is brought down onto the leading edge of the sheet 1, and is then carried forward with it under a roller 20. The roller 20 maintains downward pressure as the foil is fed at an angle to bring the silane-covered melt-surface onto the glass sheet 1; the angled feed ensures that air which would otherwise be entrapped on the glass, is squeezed out. When the whole of the glass is covered, a flying knife 21 cuts the foil at the trailing edge. This divides off from the storage reel, the element of foil and powder-coating, namely the foil 4 and powder-coating 2, that now lie in full surface contact with the glass sheet 1.

The sheet 1 with the powder-coating 2 backed by the foil 4 now moves out of the station 19 into a cooling station 22, and thence to an unloading station 23 for subsequent attachment of the backing element and board 8, where required.

The sheet 1 remains in the station 19 (at a temperature in excess of 200 degrees Celsius) with the powder-coating and foil pressed down onto it, for enough time to allow completion of the curing process in the powder. Curing establishes a bond between the sheet 1 and the powder-coating 2 (assisted by the adhesion promotion of the silane interlayer 3), and between the powder-coating 2 and the foil 4. The cured powder-coating 2 provides not only good colouration (according to the particular pigmentation used in the powder) for the visual effect in the glass, but also a strong bonding between the glass and the foil 4. Moreover, the manufacturing method described, results in a product which is free from air bubbles and ripples between the glass and coating, and between the coating and foil 4, and for which the colour-view in the glass is uniform and without blemish, across the full area of the front face of the panel. Reduction in the possibility of air or other gas bubbles affecting the coating can be achieved if the melting and curing stages of the method are carried out in a reduced-pressure or partial-vacuum atmosphere.

In the manufacturing method described above, the process of curing the fused coating or layer of powder-coating material required to form the strong interbond between glass and foil, begins within the melt station 13. That process is arrested with the reduction of temperature within the cooling station 14, and apart from the transitory boost during the momentary heating at the re-rolling station 16, is not revived until the foil is unrolled at station 17 and brought onto the hot glass in the foil-application station 19 for fulfilment of the cure.

It has been found that the fused-powder layer remains plastic or pliable, and adherent to its foil backing, during handling, in particular rolling and un-rolling, if it is at a temperature of some 70 to 80 degrees Celsius or more. However, if there is to be any significant interval between rolling and unrolling, the foil must be cooled below this so as to bring the process as close as possible to a halt until the foil is unrolled onto the glass. When cooled, there is a tendency for the fused, but only partially cured, powder to flake off and break away from its foil backing, unless it has been cured to some 80%. The tendency to flake and break-away is smaller the higher the percentage cure up to 80%.

As a general matter, it has been found desirable for the cure of the fused powder to be at least 20% before the foil is re-rolled in station 16 and otherwise handled in the intermediate state between stations 16 and 17. Provided the temperature is raised to some 70 to 80 degrees Celsius to make the fused powder plastic or pliable before it is handled, flaking and breaking away can be avoided. However, since the curing process progresses with time, and the rate of curing increases with temperature, the potential shelf life of the partially-cured powder in the intermediate state, is dependent on the temperature at which it is held while rolled or otherwise stored, and is longer the lower the percentage cure at which the stored, intermediate state begins. From a practical standpoint therefore, a balance must be struck between having the percentage cure in the intermediate state as high (in particular, up to 80%) as possible consistent with the shelf-life required, and ensuring that it is not so high that the cure is completed prematurely, in particular under the temperature-time conditions of the application of the foil-backed powder-coating to the glass in station 19.

The particular powder-coating material preferred for use in the context of the panel described above, is a polyester resin containing a catalyst agent with a triglycidyl isocyanurate curing agent; the powders sold as PPL858G and PPH857G under the trade mark DURAPLAST by Holden Surface Coatings Ltd. of Birmingham, England, are appropriate in this respect. Such powders provide structures that not only have good bonding, but have also been found to be markedly resistant to the effects of humidity and of salt, sulphur dioxide and other pollutants in the atmosphere, and to sunlight.

Although the polyester/triglycidyl-isocyanurate powders have been found advantageous in the above context, other polyester powders, and epoxy-, acrylic- and polyurethane-based powders, may be applicable in appropriate circumstances. Powders combining a polyester resin with an epoxy curing agent have, in particular, been found to provide acceptable results.

The use of an adhesion promoter between the powder-coating and the glass is desirable to facilitate a good bond; as indicated above, a silane has been used for this purpose. More especially, it has been found that an organosilane ester facilitates good bonding when applied in a solution containing 3 per cent by volume of the silane in a blend of isopropanol and distilled water for which the ratio of isopropanol to water is 4:1 by volume. Gamma-mercaptopropyltrimethoxysilane has been found especially effective when used in this way; the product sold under the Trade Mark UNION CARBIDE as Organofunctional Silane A-189 by Union Carbide Corporation is appropriate in this respect. As an alternative, gamma-aminopropyltriethoxysilane may be used.

The foil 4 used to back the powder coating is preferably an aluminium-alloy foil of hard temper. The use of a hard temper facilitates easy and clean cutting of the panel, but a low yield strength is desirable in order to reduce tendency for the glass to become bowed. As the foil 4 contracts with cooling it tends to draw the glass with it, and unless the force is absorbed by yield of the foil 4, the glass may be pulled out of flatness; a suitable hardness is 99/52.

Where the width of the glass sheet 1 is greater than the width of available foil, then two or more lengths of foil may be laid down on the sheet 1 to make up the full width. This is illustrated in FIG. 3.

Figure 3:
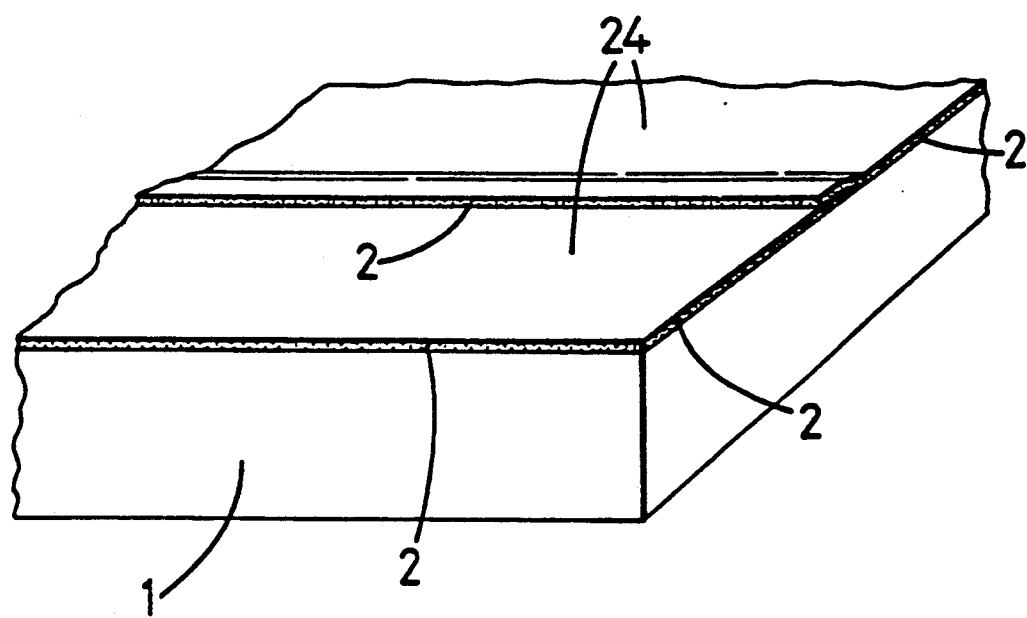
FIGS. 3 and 4 illustrate modifications of the panel of FIG. 1.

Referring to FIG. 3, separate lengths or elements 24 of foil, with their attached fused-powder coatings 2, are drawn from the same storage reel or from different reels, and are laid down on the glass sheet 1 to overlap one another along their lengths; width of overlap may be, for example, 10 millimeter. As the powder-coatings 2 of the foil elements 24 are cured to bond to the sheet 1, bonding also takes place where they overlap one another.

The technique of using separate lengths of foil described above, may be extended to the provision of decorative effect in the glass. More particularly, the different elements of foil used may carry fused powder-coatings of different pigmentation so as to create a striped effect in the glass; the differently-pigmented stripes may be of equal or differing widths. Moreover, the technique is not confined to division of the glass-area across its width, but may be applied to the production of stripe effects running widthwise, diagonally or otherwise. Furthermore, a decorative effect using principles akin to those of appliqué, may be obtained by laying down in overlapping or abutting relationship across the glass surface, various and variously-shaped elements of foil carrying suitably-pigmented powder. One or more areas of the glass may be left uncovered where a clear effect is required.

The foil with its fused powder-coating, produced in the preliminary part of the method described above, may be perforated to a desired pattern in a step intermediate the heating and rolling carried out in station 16 of FIG. 2. As an alternative, perforation may be carried out subsequent to station 16, the foil being unwound for this purpose from the storage reel after the roll has been heated to make the coating pliable, and then re-wound while still heated, after perforation has been carried out. In either case, the laying down of the coated and perforated foil on the glass in station 19 will leave one or more areas of the glass uncovered; these can be left uncovered, or covered or otherwise filled-in by other coated elements of foil. Furthermore, strips of coated foil in the form of precut tape elements, may be laid down spaced apart from one another across the glass-surface in station 19, so as to create Venetian glass.

The addition of tape elements of this nature and of alternative decorative and other powder-coated elements to the glass, may be carried out in the one operation at station 19, or may be carried out partly there and partly subsequent to unloading at station 24. Indeed, the application of all such elements to the glass may be carried out entirely separately from production of the glass, and may be effected even on glass already installed. More particularly, strips or other elements of foil carrying fused, but uncured, powder-coatings may be applied to the glass must prior to its installation or even when installed hot-air blowing equipment may be used to provide the heat necessary to melt the powder and complete its curing in contact with the glass. Such method is particularly suited to circumstances where glass doors and windows in public places are to be marked with warning signs and/or lines, logos and other decorative items.

With the method described above in which a layer of fused, but uncured, powder is formed on a foil backing and is bonded to a glass surface by melting the powder and fulfilling its cure in contact with the surface, the foil remains bonded to the cured powder and thus to the glass. The preliminary method of preparation of the foil backing with its layer of fused, but uncured, powder may, however, be modified to allow for removal of the foil once application to the glass has been made. This may be desirable especially where both sides of the glass are to be visible, and where, for example, a coloured decorative effect of lines or logo, is to be presented. To this end, the preparation of the foil includes the introduction of a layer of release agent on the surface of the foil before it receives the powder (for example, prior to reaching station 12 of FIG. 2); such a release agent may be heat- or temperature-sensitive so as to hold the fused powder-coating fast until a heat or temperature threshold is exceeded. The foil with its layer of powder-coating then functions in the manner of a transfer for application to the glass surface, transfer of the powder coating into a cured, firm bond with the surface, and stripping away of the foil backing, taking place with the application of heat, for example by means of a hot-air blower, to the foil and glass.

It may, however, be possible to strip the foil from the powder while the powder is melted, prior to completion of its cure, without the need for a release agent on the foil.

Variation of colour within a single body of powder-coating may be achieved by means of polychromated inks that are diffused into the body of powder while the powder is in its fused, uncured state; inks sold under the trade mark ALKATEX by Coates Brothers Inks Limited of St Mary Cray, England, are appropriate in this respect. In particular, such inks can be used to create multi-colour designs on paper for transfer to the body of uncured powder on the foil backing. The transfer of the ink design to the powder is carried out under heat created by infra-red or other heaters that cause the ink to boil and fuse into the powder layer and reproduce the design in the powder (at least in the free surface). The application of the powder layer to the glass to be cured and bonded firmly to it, sandwiches the design to the back surface of the glass for viewing from the front. Care is required in the application of the design-bearing layer to the glass to avoid smudging.

Alternatively, or in addition, different pigmentations may be achieved in different areas of a single body of fused powder-coating, simply by depositing the differently-pigmented powders on the foil where required (for example, within station 12 of the production line illustrated in FIG. 2). Stencils may be used for achieving the required delineation of the different powders. There is in general minimal diffusion of pigmentation across the interface between powders during the melt end curing phases, and so the colour pattern is retained in the fused, but not cured, powder on the foil, and then again in the final product after the powder on the foil carrier has been applied to the glass and heated to melt the powder and fulfil the curing.

Colour and other decorative effect in the glass need not be dependent wholly or partially on pigmentation or other colouring of the powder coating. In particular, pigment may be omitted or so reduced from the coating powder in the panel of FIG. 1, that the coating 2 is transparent (clear or tinted) and exposes the foil 4 to view from the front of the glass sheet 1. Thus colour and/or other decorative effect in the glass is realised in this case mainly, and possibly totally, by what is visible on the bonded surface of the foil 4. This surface may be readily coloured and/or otherwise decorated, such step being taken prior to deposition of the powder at, for example, station 12 of the production line of FIG. 2. Where the bonded surface is polished, a mirror effect is achieved, and any colour of that surface is then incorporated into the mirror together with any tinting there may be in the coating 2.

Reflectivity in the glass, whether using coloured or pigment-free powder, may be achieved by including small glass spheres or microspheres in the powder. The effect can be enhanced by metallising the spheres partially.

A combined mirror and colour effect can be achieved by sputtering or otherwise depositing a thin layer of metal on part or parts of the back surface of the glass prior to applying the foil with its fused powder-coating. The metallized part or parts give a mirror effect with the pigmentation of the cured powder-coating showing in the glass elsewhere. This techniques may be applied, for example, to the provision of distinctive lettering or other symbology in the glass, as will now be described with reference to FIG. 4 which illustrates the letter T as this is both delineated on part of the back surface of the glass and is visible in the glass from the front.

Figure 4:
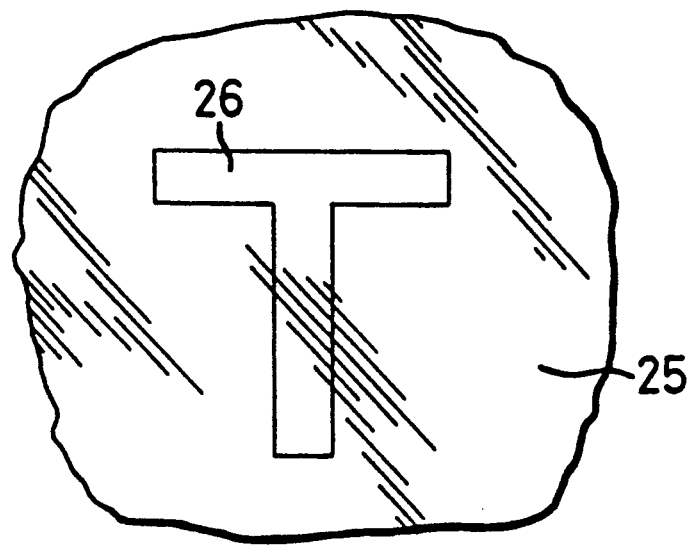

Referring to FIG. 4, metal is sputtered on the back surface of the glass throughout a region 25 which surrounds an area 26 that is free of metallization and delineates the letter T; alternatively, the metal may be sputtered onto the glass throughout the area 26 leaving the region 25 clear. In the first case, the view from the front of the panel will show the letter T in colour against a mirror background, where the powder-coating on the back surface shows through the area 26, whereas in the second case, the letter T will appear in mirror form against the colour background of the region.

It is possible to produce designs on the back surface of the glass using silk-screen printing the inks sold under the trade marks SILCHROME and TOUCAN by Coates Brothers Inks Limited, are suitable for this purpose.

Figure 5:
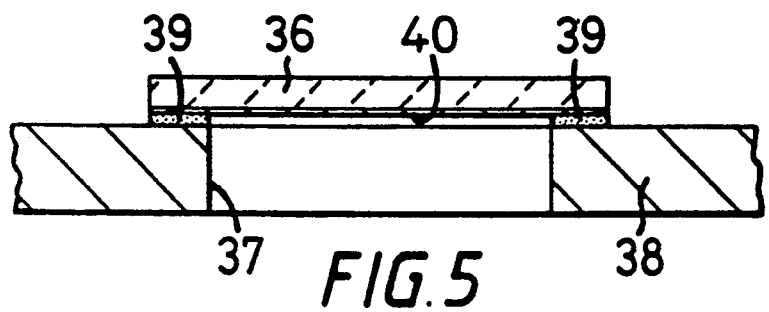
FIGS. 5 and 6 are sectional side-views of further articles manufacture by methods in accordance with the present invention.
Figure 6:
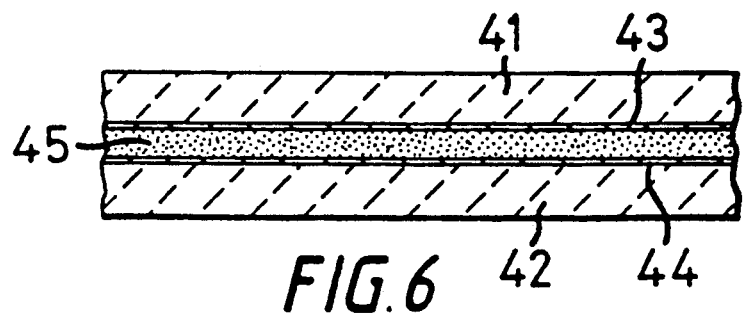

The method of the present invention may be applied as illustrated in FIGS. 5 and 6, to the bonding of glass over an aperture in a metal wall, and to the formation of a glass laminate, respectively.

Referring to FIG. 5, a glass sheet 36 is located over an aperture 37 in a metal wall 38, the sheet being bonded to the wall 38 by cured powder-coating material 39; the coating 39 is shown confined to the margin of the aperture 37, but clearly it could extend across the whole of the wall face. In manufacture of this article, the contacting face of the sheet 36 is initially provided with a coat 40 of a silane adhesion-promoter, and an epoxy or other coating powder is applied around (at least) the margin of the aperture 37 of the wall 38. The powder is now heated to fuse it into a unified mass adhering to the metal wall, but not sufficiently to cure it. Once the powder-coating has cooled, the glass sheet 36 can be placed face down over the aperture 37 and adjusted in position to achieve a desired, accurate location. With the silane-coated areas of the sheet 36 pressed into surface contact with the hardened powder-coating around the aperture margin, the whole is heated to melt the powder again. The sheet 36 is retained firmly in place in the melt while heating continues until curing of the powder is fulfilled to form the coating 39 bonding the glass sheet 36 to the wall 38, over the aperture 37.

In the example of FIG. 6, two glass sheets 41 and 42, which have coats 43 and 44 respectively, of a silane adhesion promoter, are bonded together as a laminate by means of a polyester or other powder coating 45. Such a laminate is applicable, for example, where colour but opacity, or at least translucency, is required with glass facing on both sides of the laminate. Manufacture is carried out by first depositing powder on the silane-prepared face of each sheet 41 and 42, melting the powder, and then allowing it to cool as a single fused body on that sheet; powders of different pigmentations may be deposited on the two sheets 41 and 42. The two sheets are now brought together with their fused powder-coatings pressed against one another, and heat is applied to cause both bodies of powder to melt and merge with one another and then cure to form the unified coating 45 bonding the two sheets 41 and 42 together. The likelihood of entrapping gas in the laminate can be reduced, by carrying out the manufacturing steps within a reduced-pressure atmosphere.

Laminated glass may be manufactured in an alternative way using a foil that is prepared with fused powder-coating layers on both sides. The two glass sheets (appropriately silane coated) are brought into contact with the layers on the two sides of the foil, and heat is applied to melt the powder layers and fulfil their curing while contact with the glass is maintained on both sides. In this method the foil backing is sandwiched between the glass sheets and bonded firmly to both by the cured powder-coatings. The backing can in this way strengthen the laminate and improve its impact resistance, and the choice of the backing, both as regards its material and structure, can be made in order to meet safety or other security requirements. For example, instead of using an aluminium foil, a sheet of thin steel or even a mesh of wires (e.g. Georgian wire), can be used.

The thermosetting organic powder-coating materials that are suitable for use in the various embodiments of the invention described above, include polyester, epoxy-, acrylic- and polyurethane-based powders. Such powders may include, as well as pigments where appropriate, extenders in the form of mineral fillers, and flow modifiers.

The use of polyester/triglycidyl-isocyanurate powders has been described in the context of the embodiment of FIG. 1, but as an alternative, a polyester resin with an epoxy curing agent may be used. The catalyst included may be typically choline chloride, stannous octoate, or tetrabutylammoniumbromide to a level typically from 0 to 0.2 per cent. Furthermore, an epoxy resin with a dicyandiamide curing agent may be used. All such powders may find application in the other embodiments described.

Although the method described with reference to FIG. 2 is set in the context of glass production with the glass sheet leaving the line 18 hot to enter the station 19 directly for foil application, this is not essential. The described method may be executed independently of a glass-production line or in other circumstances where it is necessary to clean and heat the sheet of glass before it enters the foil-application station 19.

I claim:

1. In a method of manufacturing an article that comprises a component and cured thermosetting powder material bonded to said component, the method comprising a first step of heating thermosetting organic powder to fuse it into a layer on a backing member, and a second step of forming a bond between the fused-powder layer and said component by maintaining contact between the fused-powder layer and said component while the powder is melted and until the powder is cured, the improvement wherein the first and second steps are carried out as discretely separate steps with an interval of time between them, and the fused-powder layer on the backing member is cooled following said first step and before said second step to retard curing of the fused-powder layer in said interval.

2. A method according to claim 1 wherein the fused-powder layer is cooled between the first and second steps to harden it.

3. A method according to claim 2 wherein said second step includes heating the hardened fused-powder layer to re-melt it prior to making contact between the fused-powder layer and said component.

4. A method according to claim 2 wherein said second step includes bringing the hardened fused-powder layer into contact with said component, and then re-melting it while maintaining said contact between the fused-powder layer and said component.

* * * * *